US007350398B2

(12) United States Patent
Gardiner

(10) Patent No.: US 7,350,398 B2
(45) Date of Patent: Apr. 1, 2008

(54) SMOKE SENSING DEVICE FOR INTERNAL COMBUSTION ENGINES

(76) Inventor: David Phillip Gardiner, 1718 Blue Mountain Rd., RR #4, Mallorytown, Ontario (CA) K0E 1R0

( * ) Notice: Subject to any disclaimer, the term of this patent is extended or adjusted under 35 U.S.C. 154(b) by 324 days.

(21) Appl. No.: 11/258,090

(22) Filed: Oct. 26, 2005

(65) Prior Publication Data

US 2006/0090540 A1 May 4, 2006

Related U.S. Application Data

(60) Provisional application No. 60/622,590, filed on Oct. 28, 2004.

(51) Int. Cl.
*G01N 37/00* (2006.01)

(52) U.S. Cl. .................................................... 73/28.01

(58) Field of Classification Search ................ 73/28.01
See application file for complete search history.

(56) References Cited

U.S. PATENT DOCUMENTS

| | | | | |
|---|---|---|---|---|
| 4,485,794 | A | 12/1984 | Kimberley et al. | |
| 4,567,750 | A | 2/1986 | Artmann | |
| 6,634,210 | B1 | 10/2003 | Bosch et al. | |
| 7,096,074 | B2 * | 8/2006 | Yulevitch et al. | 700/21 |

OTHER PUBLICATIONS

Gould, D., Gardiner, D.P., Laviolette, M. and Allan, W.D., "Further Development of a Smoke Sensor for Diesel Engines", Proceedings of ICEF 2005, ASME Internal Combustion Engine Division Fall Technical Conference, Sep. 11-14, 2005, Ottawa, Canada.

Warey, A., Hendrix, B., Hall, M., and Nevius, T., "A New Sensor for On-Board Detection of Particulate Carbon Mass Emissions from Engines", SAE Paper #82004-01-2906, Society of Automotive Engineers, Philadelphia, PA 2004.

Allan, W.D.E., Freeman, R.D., Pucher, G.R., Faux, D., Bardon, M.F., and Gardiner, D.P., "Development of a Smoke Sensor for Diesel Engines" SAE Paper #2003-01-3084, Society of Automotive Engineers, Philadelphia, PA 2003.

Hong, G., Collings, N. and Baker, N.J., "Diesel Smoke Transient Control Using a Real-Time Smoke Sensor", SAE Paper #871629, Society of Automotive Engineers, Philadelphia, PA 1987.

Collins, N. Baker, N. and Wolber, W.G., "Real-Time Smoke Sensor for Diesel Engines", SAE Paper #860157, Society of Automotive Engineers, Philadelphia, PA 1986.

Schweimer, G.W. "Ion Probe in the Exhaust Manifold of Diesel Engines", SAE Paper #860012, Society of Automotive Engineers, Philadelphia, PA 1986.

* cited by examiner

*Primary Examiner*—Hezron Williams
*Assistant Examiner*—Rodney Frank

(57) ABSTRACT

A smoke sensing device for internal combustion engines comprises an electrode assembly with a heated insulator, a high voltage spark system, a voltage attenuator and a signal conditioning system. The electrode assembly is installed in an engine exhaust pipe so that the spark gap between the electrodes is exposed to the exhaust gas. A series of sparks is produced across the spark gap and the spark voltage is sensed and attenuated to produce a voltage signal. At a selected time during the spark, the voltage signal is compared with a reference voltage. The smoke content of the exhaust gas is derived from the frequency of occurrence of sparks where the voltage signal value is less than the reference value at the selected time. The heated insulator burns off carbon deposits on the insulator surface. The repetitive sparks keep the electrode surfaces free of carbon deposit build-up.

9 Claims, 4 Drawing Sheets

SMOKE SENSING DEVICE FOR INTERNAL COMBUSTION ENGINES

CROSS REFERENCES TO RELATED APPLICATIONS

This Application Claims the Benefit of Provisional Patent Application Ser. No. 60/622,590 Filed Oct. 28, 2004.

BACKGROUND

1. Field of the Invention

This invention relates to a system and method that utilizes an exhaust gas sensor to determine a smoke level of exhaust gases in the exhaust system of an internal combustion engine.

2. Description of Prior Art

Internal combustion engine such as diesel engines can produce exhaust particulate emissions (commonly referred to as "smoke") which pollute the ambient air. An exhaust smoke sensor on-board the engine or vehicle could enable closed loop engine control systems to limit or minimize these emissions, and could diagnose the performance of emission controls (such as particulate filters) that are intended to reduce particulate levels in the exhaust gases. Laboratory instruments capable of real time smoke measurements exist but these analysers require windows in the exhaust pipe or a sampling system to transfer exhaust gas from the engine to the analyzer. A rugged sensor suitable for direct installation in an engine exhaust pipe is needed for on-board applications.

A number of researchers have studied approaches to smoke sensing in which electrodes are inserted into the exhaust flow. In one approach, the electrodes are used to detect the naturally occurring electrical charges of the soot particles in the smoke. For example, U.S. Pat. No. 4,485,794 describes a system in which a particulate level signal is provided by sensing charged particles with an electrically-passive annular electrode positioned in the exhaust stream. In another approach, a high voltage bias is imposed between a pair of electrodes and the flow of electrical current (due to the conductivity of the soot particles) is measured. For example, Society of Automotive Engineers (SAE) technical paper SAE 2004-01-2906 describes a particulate carbon sensor with a typical bias voltage of 1000 V and current measurement by means of a charge amplifier circuit. Both of these approaches are subject to measurement errors when soot particles accumulate on the electrode surfaces. Neither of these approaches has demonstrated the ability to measure the low smoke levels emitted by low emission, clean diesel engines.

Another type of sensor described in U.S. Pat. No. 6,6324,210 monitors the accumulation of soot particles on a non-conductive substrate between a pair of electrodes by measuring the resistance between the electrodes. The sensor must be regenerated periodically by heating it to burn off the accumulated soot particles; therefore it is not suitable for continuous real time measurements.

SUMMARY OF THE INVENTION

The object of the invention is to provide a means of measuring smoke emissions (also referred to as soot, black carbon or particulate emissions) in exhaust gases from diesel engines including low emission, clean diesel engines. Other applications include other types of piston engines, gas turbines, and other combustion devices which produce smoke emissions. The above object is accomplished by a smoke sensor system comprising an electrode assembly (similar in construction to a conventional spark plug) with an electrically heated insulator nose, a high voltage electrical circuit which creates a spark across the electrode gap of the electrode assembly, a voltage measurement circuit which measures the voltage across the electrode gap during the spark, and a signal conditioning circuit which produces an output signal proportional to exhaust smoke levels based upon the voltage measurements from a series of sparks.

One advantage of the invention is that its novel sensor is inserted directly into the exhaust stream being measured. This avoids any need to provide optical access through the exhaust gas (such as windows in the exhaust pipe which must be kept clean). It also eliminates any need to provide a sampling system to draw exhaust gas from the diesel engine exhaust system and pump it through a remotely located analyzer.

Another advantage of the invention is its ability to operate in an environment where carbon from the exhaust smoke is deposited on the sensor, because this sensor self-cleans (removes carbon deposits) during operation. Another advantage of the invention is its ability to measure the low smoke levels emitted by low emission, clean diesel engines.

Other advantages of the invention are its simplicity, ruggedness, and low cost, which make it suitable as an on-board sensor for vehicles in addition to off-board test and measurement applications.

BRIEF DESCRIPTION OF THE DRAWINGS

The accompanying drawings serve to explain the principles to the invention.

DETAILED DESCRIPTION OF THE INVENTION

Figure 1:
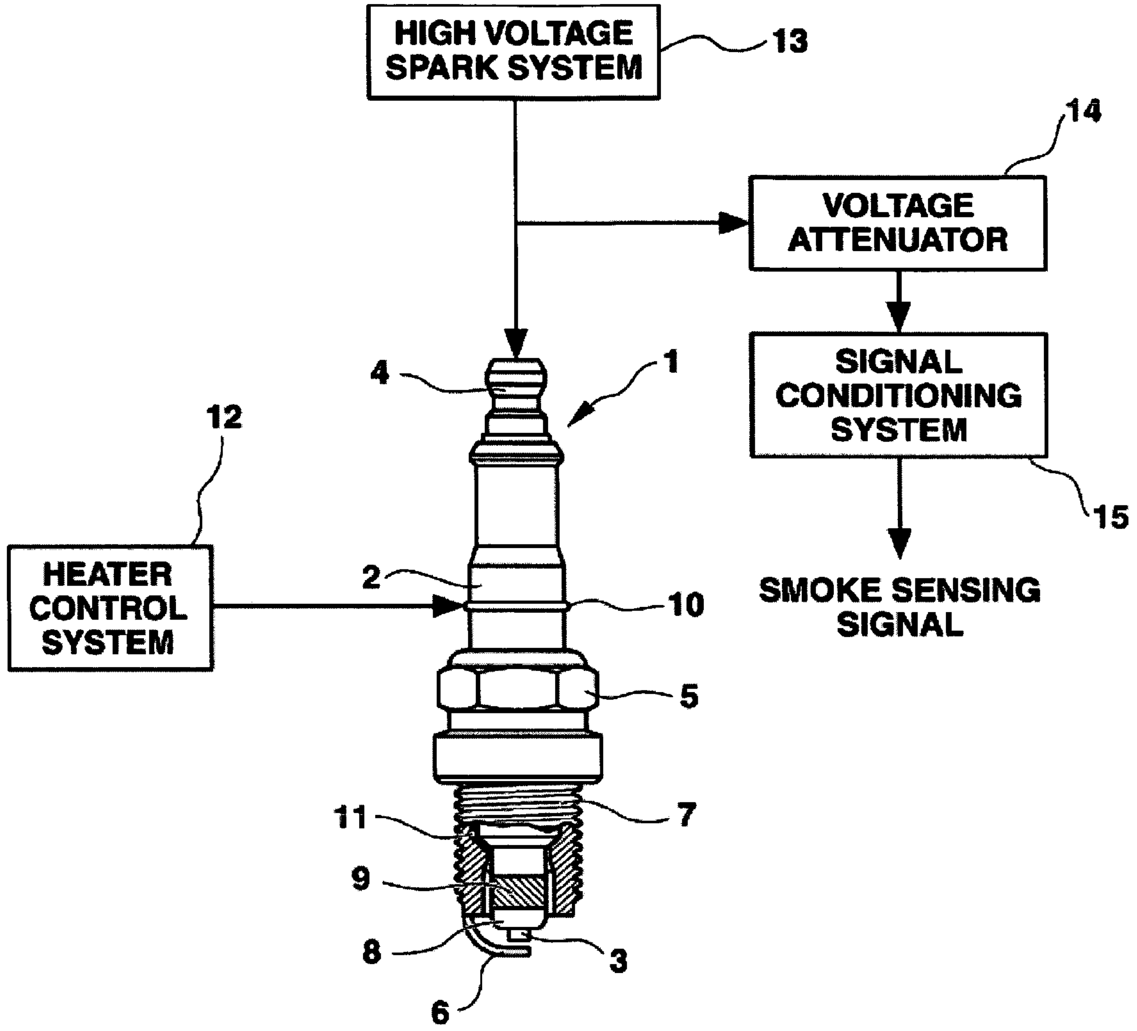
FIG. 1 is a block diagram illustrating the general features of the smoke sensing system.

FIG. 1 is a block diagram of the smoke-sensing device. The sensor 1 is an electrode assembly similar in construction to a conventional spark plug. The sensor 1 is comprised of an insulator 2, a center electrode 3 projecting from one end of the insulator 2, a terminal electrode 4 provided at the opposite end of the insulator 2 with a basal portion held within an axial bore of the insulator 2 and a metal shell 5 having a ground electrode 6 at a position opposite to a free end of the center electrode 3 and a threaded portion 7 adapted to fix the sensor 1 in a threaded hole in the exhaust pipe on an internal combustion engine. Arranged on or within the insulator hose 8 is an electric heater 9 connected to a current-feeding terminal 10 on the upper part of the insulator 2 via a lead wire 11 embedded along the surface of the insulator 2.

The current-feeding terminal 10 for the heater 9 is connected to a heater control system 12. The terminal electrode 4 is connected to a high voltage spark system 13 and the input of a voltage attenuator 14; the output of the voltage attenuator 14 is connected to the input of the signal conditioning system 15. The output of the signal conditioning system 15 is a signal proportional to the smoke concentration of the gas flowing between the center electrode 3 and the ground electrode 6.

Figure 2:
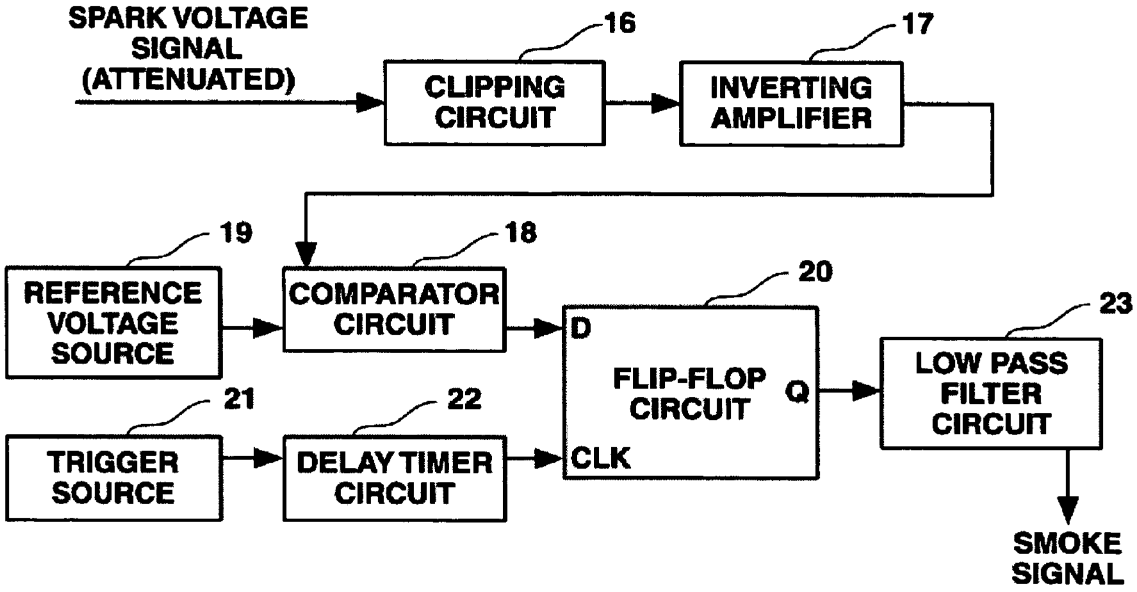
FIG. 2 is a block diagram illustrating the general features of the signal conditioning system for the smoke sensor system.

FIG. 2 is a block diagram of the signal conditioning system. The attenuated spark voltage is connected to the input of a clipping circuit 16. The output of the clipping circuit 16 is connected to the input of an inverting amplifier circuit 17. The output of the inverting amplifier circuit 17 is connected to one input of a comparator circuit 18. The other input of the comparator circuit 18 is connected to a reference voltage source 19.

The output of the comparator circuit 18 connected to the D input of a D-Type FLIP-FLOP 20 trigger source 21 is connected to the trigger input of a delay timer circuit 22. The output of the delay timer circuit 22 is connected to the clock input of the FLIP-FLOP circuit 20. The output of the FLIP-FLOP circuit 20 is connected to the input of a low pass filter circuit 23. The output of the low pass filter on circuit 20 is an analog voltage proportional to the smoke levels being measured.

Referring first to FIG. 1, the sensor 1 is installed in the exhaust manifold, pipe, or duct of an internal combustion engine so that the gap between the center electrode 3 and the ground electrode 6 is exposed to the exhaust gas for which the smoke measurement is being made. The heater control system 12 modulates the current through the heater 9 so as to maintain the temperature of the insulator hose 8 at a level high enough to burn off carbon deposits. The heater 9 is also used to limit variations in the temperature of the center electrode 3 as it is exposed to variations in exhaust gas temperature.

The high voltage spark system 13 provides a negative polarity voltage to the terminal electrode 4, which is sufficient to ionize the gas in the gap between the center electrode 3 and the ground electrode 6, thus creating a spark. Because of the negative voltage polarity, the center electrode 3 serves as a cathode. Once a spark is created, it is sustained by current from the high voltage spark system 13 for a brief period of time (typically less than 100 microseconds). The current level of the spark is limited so that, when no smoke is present, the current density on the surface of the center electrode 3 will be insufficient to create the cathode hot spots necessary to maintain what is commonly known in the field as an arc discharge. Thus, the spark is sustained by a cold cathode liberation mechanism commonly known in the field as a glow discharge.

The presence of smoke at the surface of the center electrode 3 leads to hot spot formation and occurrences of arc discharges. For repetitive sparks in exhaust gas containing smoke, the frequency of occurrence of these discharges is related to the smoke concentration in the gas. The arc discharges can be distinguished from glow discharges because the voltage of the spark is lower in arc mode that in glow mode. The repetitive sparks (typically at 100 Hz or greater) also keep the center electrode 3 and ground electrode 6 free of carbon deposit build-up.

The voltage attenuator 14 reduces the spark voltage sensed at the terminal electrode 4 to a level (typically less that 10 volts peak) that can be monitored by the signal conditioning system 15, which is shown in detail in FIG. 2. Depictions of waveforms illustrating by example, one means of operating the signal conditioning system 15 are shown in FIG. 3 and FIG. 4.

Figure 3:
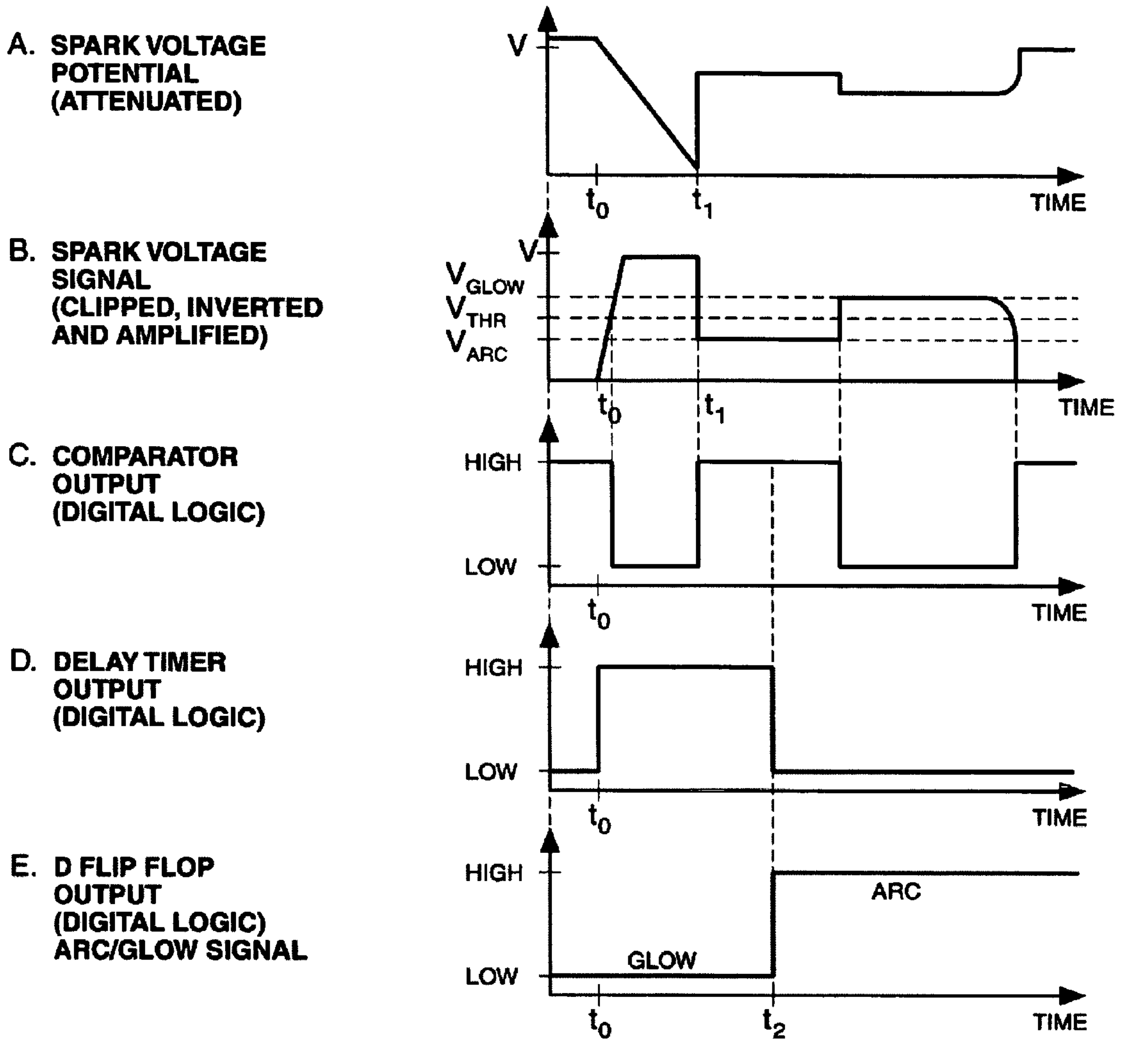
FIG. 3 shows electrical waveforms illustrating a first example of the operation of the signal conditioning system.
Figure 4:
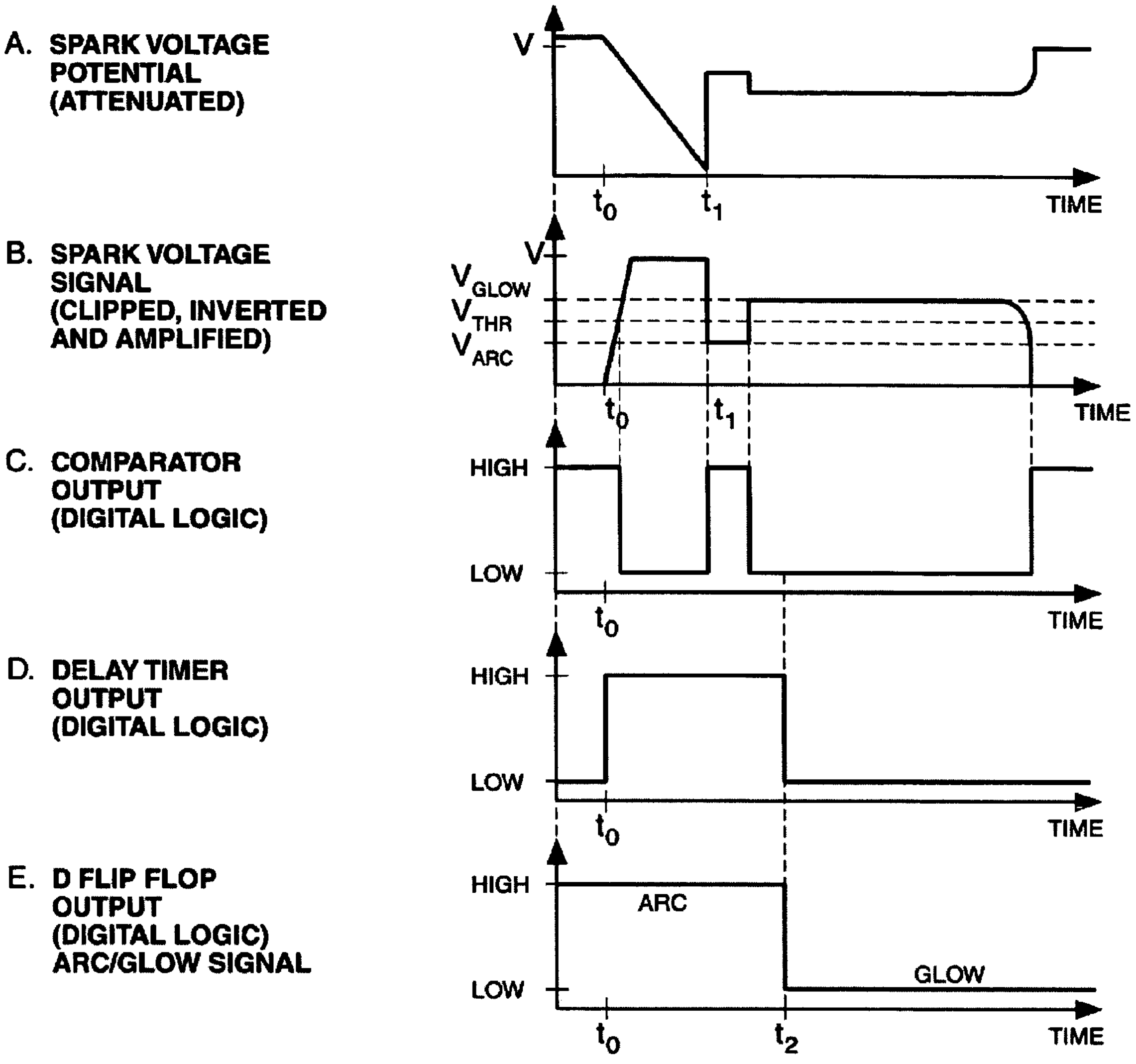
FIG. 4 shows electrical waveforms illustrating a second example of the operation of the signal conditioning system.

Referring to FIG. 3, the signal conditioning system 15 receives a negative polarity voltage signal from the voltage attenuator 14, as shown in FIG. 3A. The voltage begins to increase at $t_0$, and reduces abruptly at $t_1$ when the gas in the gap between the center electrode 3 and the ground electrode 6 is ionized and the spark discharge begins.

A clipping circuit 16 clips the maximum voltage level of the attenuator signal and an inverting amplifier 17 amplifies the waveform as depicted in FIG. 3B. During the period when the spark is sustained (following $t_1$), the voltage will be at approximately one of two levels ($V_{ARC}$ or $V_{GLOW}$) depending upon whether the discharge is in arc mode or glow mode. A threshold voltage ($V_{THR}$) is selected which is midway between $V_{ARC}$ and $V_{GLOW}$ for the physical characteristics of the sensor 1 being used.

This threshold voltage is used as a reference voltage for a comparator circuit 18, which monitors the spark voltage signal. In the example shown in FIG. 3C, this results in a comparator output logic signal which switches high when the spark is in arc mode and low when the spark is in glow mode. FIG. 3C shows that the comparator output signal is also high before and after the spark.

A delay timer circuit 22 produces a logic pulse shown in FIG. 3D that begins at $t_0$, and ends at $t_2$, a selected time following $t_1$ when the spark is expected to be in either arc mode or glow mode. The end of the delay timer output pulse (a falling edge in this example) triggers the clock input of a D-Type FLIP-FLOP circuit 20 which receives the comparator output as its input signal. As shown in FIG. 3E, this stores the current logic state of the comparator output in the FLIP-FLOP 20, and it appears at the FLIP-FLOP output until the clock is triggered again during the next spark.

FIG. 4 depicts the sequence of events when the previous spark was sampled as an arc discharge, and the current spark is sampled as a glow discharge. In FIG. 4B, the spark is in arc mode initially after $t_1$, but changes to glow mode before $t_2$. Since the comparator output (FIG. 4C) is in a low state at $t_2$, the current spark is sampled as a glow discharge, and the FLIP-FLOP output FIG. 4E (which, in this example, was in a high state from the previous spark) switches low at $t_2$ The final output of the smoke sensing system is obtained by averaging the FLIP-FLOP output signal over a number of sparks. For example, if the output of the FLIP-FLOP is 5 Volts high or 0 Volts low, a low pass filter circuit 23 will produce an analog smoke signal ranging from 0 Volts (when all of the sparks are glow discharges) to 5 Volts (when all of the sparks are arc discharges), with intermediate values proportional to the frequency of occurrence of arc discharges.

The functions depicted in FIG. 3 and FIG. 4 can be implemented using a wide variety of circuit options other than those depicted in FIG. 2, and are easily achieved by anyone skilled in the art.

It is to be understood that a wide range of changes and modifications to the embodiment described above will be apparent to those skilled in the art and are contemplated. It is therefore intended that the foregoing detailed description be regarded a illustrative rather than limiting, and that it be understood that it is the following claims, including all equivalents, that are intended to define the spirit and scope of the invention.

What is claimed is the following:

1. A method of detecting and measuring the content of smoke, soot or particulates in gases, particularly in exhaust gases of internal combustion engines, comprising the steps of:

producing a series of sparks in said gases;

obtaining a series of signals corresponding to the voltage levels during each spark of said series of sparks;

deriving a measuring value for the content of smoke, soot, or particulates in said gases from a statistical parameter of said series of signals.

2. The method of claim 1 wherein the calculation of said statistical parameter includes determining a signal value for each spark at a predetermined time period within the duration of each spark.

3. The method of claim 2 wherein the calculation of said statistical parameter further includes determining whether said signal value is greater than or less than a predetermined reference value during said predetermined time period.

4. The method of claim 3 wherein the calculation of said statistical parameter further includes either determining the frequency of occurrence of sparks where said signal value is greater that said predetermined reference value, or determining the frequency of occurrence of sparks where said signal value is less than said predetermined reference value.

5. A system for detecting and measuring the content of smoke, soot or particulates in gases, particularly in exhaust gases of internal combustion engines, comprising:

a sensor comprising a first electrode, a second electrode, said first and second electrode being separated by an insulator, said first and second electrodes being positioned to form a gap in the gases being measured;

a means of producing a series of sparks across said gap;

a means of obtaining a series of signals corresponding to the voltage levels during each spark of said series of sparks;

a means of deriving a measuring value for the content of smoke, soot or particulates in said gases from a statistical parameter of said series of signals.

6. The system of claim 5 wherein said sensor includes a means of heating said insulator.

7. The system of claim 5 wherein the calculation of said statistical parameter includes determining a signal value for each spark at a selected time period within the duration of each spark.

8. The system of claim 7 wherein the calculation of said statistical parameter further includes determining whether said signal value is greater than or less than a predetermined reference value during said time period.

9. The system of claim 8, wherein the calculation of said statistical parameter further includes either determining the frequency of occurrence of sparks where said signal value is greater than said predetermined reference value, or determining the frequency of occurrence of sparks where said signal value is less than said predetermined reference value.

* * * * *